United States Patent
Mukai et al.

(10) Patent No.: US 8,873,212 B2
(45) Date of Patent: Oct. 28, 2014

(54) PROTECTION CIRCUIT, BATTERY CONTROL DEVICE, AND BATTERY PACK

(75) Inventors: Koichi Mukai, Osaki (JP); Masahiko Ishimaru, Osaki (JP); Takahiro Asada, Osaki (JP); Chisato Komori, Osaki (JP); Yoshihiro Yoneda, Osaki (JP); Yuuji Kimura, Osaki (JP); Shoko Nagaki, Osaki (JP)

(73) Assignee: Dexerials Corporation, Tokyo (JP)

( * ) Notice: Subject to any disclaimer, the term of this patent is extended or adjusted under 35 U.S.C. 154(b) by 271 days.

(21) Appl. No.: 13/578,865

(22) PCT Filed: Dec. 29, 2010

(86) PCT No.: PCT/JP2010/073839
§ 371 (c)(1),
(2), (4) Date: Oct. 31, 2012

(87) PCT Pub. No.: WO2011/102067
PCT Pub. Date: Aug. 25, 2011

(65) Prior Publication Data
US 2013/0044402 A1    Feb. 21, 2013

(30) Foreign Application Priority Data

Feb. 19, 2010 (JP) .................. 2010-034436

(51) Int. Cl.
*H02J 7/00* (2006.01)
*H01M 2/34* (2006.01)
*H01M 10/48* (2006.01)
*H01M 10/44* (2006.01)
*H01M 10/0525* (2010.01)
*H02H 7/18* (2006.01)

(52) U.S. Cl.
CPC .......... *H01M 2/348* (2013.01); *H01M 10/0525* (2013.01); *H02H 7/18* (2013.01); *H01M 10/48* (2013.01); *Y02E 60/12* (2013.01); *H02J 7/0031* (2013.01); *H01M 10/443* (2013.01)
USPC ....................................... 361/104

(58) Field of Classification Search
CPC ........ H02J 7/0026; H02J 7/0031; H02H 5/04; H02H 7/18; H01M 10/443; H01M 10/48; H01M 10/0525; H01M 2/348; Y02E 60/12
USPC ........................................... 361/104
See application file for complete search history.

(56) References Cited

U.S. PATENT DOCUMENTS 5,497,286 A * 3/1996 Shimada et al. .............. 361/105

FOREIGN PATENT DOCUMENTS

| JP | 2000-340267 A | 12/2000 |
| JP | 2007-123129 A | 5/2007 |
| JP | 2007-135359 A | 5/2007 |
| JP | 2007-207940 A | 8/2007 |

OTHER PUBLICATIONS

International Search Report w/translation from PCT/JP2010/073839 dated Apr. 5, 2011 (2 pages).

* cited by examiner

*Primary Examiner* — Jared Fureman
*Assistant Examiner* — Kevin J Comber
(74) *Attorney, Agent, or Firm* — Osha Liang LLP

(57) ABSTRACT

A protective circuit capable of coping with broad voltage variations of a battery unit to interrupt its charging/discharging current path as damages to the heating unit are prevented from occurrence is disclosed. The protective circuit includes fuses, connected to a charging/discharging current path in series between a battery unit and a charging/discharging control circuit, and a heating unit composed by a series connection of resistors. One of two ends of the resistor which is not connected to the peer resistor is connected to a current path of the fuses. The ends of the resistors not connected to the fuses, are provided with a plurality of terminals selected for connection to a current control element that controls the current flowing through the heating unit, as a range of voltage variations of the battery unit is taken into account.

10 Claims, 8 Drawing Sheets

PROTECTION CIRCUIT, BATTERY CONTROL DEVICE, AND BATTERY PACK

TECHNICAL FIELD

This invention relates to a protective circuit for protecting a battery unit composed by a plurality of chargeable/dischargeable battery cells and a charging/discharging control circuit. This invention also relates to the charging/discharging control device, with the protective circuit built therein, and to a battery pack.

The present application asserts priority rights based on JP Patent Application 2010-034436 filed in Japan on Feb. 19, 2010. The total contents of disclosure of the Patent Application of the senior filing date are to be incorporated by reference into the present Application.

BACKGROUND ART

A protective circuit comprised of a heater and low melting metal arranged on a substrate has so far been used as a protective circuit that is able to prevent not only over-current but also over-voltage and that may be used to advantage for secondary batteries for use in e.g., mobile electronic equipment.

In the protective circuit that protects the operation of the battery unit composed by a plurality of battery cells, there are occasions where shorting, for example, is produced in the inside of one or more battery cells to cause marked changes in the voltage within the circuit. If one or more of the battery cells is in disorder, the voltage of the battery unit is severely lowered, with the consequence that the heat quantity of a heating element is lowered so that the low melting metal may not be disrupted on melting. On the other hand, in case the battery unit voltage increases precipitously by some reason or other, the heating element emits excess heat, with the consequence that the heating element is scorched and hence falls into disorder so that the low melting metal may not be disrupted on melting.

To positively prevent the above mentioned damages to the heating resistance element to positively disrupt the low melting metal on melting, Patent Publication 1 discloses the following protective circuit. Viz., Patent Publication 1 discloses such a protective circuit in which, if a pre-set supply voltage is delivered thereto, the resistance value of a PTC, connected to the heating resistance element, is increased, with the current flowing through the heating resistance element being then lowered. It is possible in this manner to prevent large current from flowing through the heating resistance element to prevent it from scorching.

RELATED TECHNICAL DOCUMENT

Patent Publication

Patent Publication 1: Japanese Laid-Open Patent Publication 2007-135359

DISCLOSURE OF THE INVENTION

Problem to be Solved by the Invention

However, if, in the protective circuit, disclosed in Patent Publication 1, the voltage applied to the heating resistance element is low, but the resistance value of the PTC is raised due to heating, the operation of the heating element is less vigorous, with the result that the low melting metal is unable to be disrupted on melting. In addition, in the protective circuit, the resistance value of the heating element in its entirety is varied in response to temperature characteristics of the PTC. Hence, the heat quantity is labile, with the result that the time of disruption of low melting metal on melting is labile. Furthermore, if the battery unit voltage is changed precipitously, an excess voltage may be applied to the heating element before the resistance value of the PTC is sufficiently increased, thus leading to malfunctions. Consequently, there are occasions where low melting metal may not be disrupted on melting.

The present invention has been proposed in view of the above depicted status of the art. It is an object of the present invention to provide a protective circuit that is able to cope with large voltage variations of the battery unit to reliably melt the low melting metal by heat of the heating unit to interrupt the charging/discharging current path of the battery unit as the heating element is prevented from becoming damaged. It is another object of the present invention to provide a battery unit control device that has the protective circuit built therein, and a battery pack.

Means to Accomplish the Objects

As a means to accomplish the above objects, a protective circuit according to the present invention includes a low melting metal connected to a charging/discharging current path in series between a battery unit composed by one or more chargeable/dischargeable battery cells and a charging/discharging control circuit. The low melting metal is melted and disrupted on heating. The protective circuit also includes a heating unit composed by a plurality of resistors that, when fed with current, emit heat that melts the low melting metal. One of two ends of the plurality of resistors which is not connected to the peer resistor is connected to a current path of the low melting metal. The ends of the resistors not connected to the low melting metal are provided with a plurality of terminals selected for connection to a current control element that controls the current flowing through the heating unit, as a range of voltage variations of the battery unit is taken into account.

A battery unit control circuit according to the present invention includes a charging/discharging control circuit connected in series with a battery unit composed by a plurality of chargeable/dischargeable battery cells. The charging/discharging control circuit controls the charging/discharging of the battery unit. The battery unit control circuit also includes low melting metal connected to a charging/discharging current path in series between the battery unit and the charging/discharging control circuit. The low melting metal is melted and disrupted on heating. The battery unit control circuit also includes a heating unit composed by a plurality of series-connected resistors that, when fed with current, emit heat that melts the low melting metal. The battery unit control circuit also includes a detection circuit that detects a voltage value of each battery cell of the battery unit, and a current control element. The current control element exercises control to cause the current to flow from the low melting metal to the heating unit when the voltage value of one or more of the battery cells of the battery unit is outside a pre-set range. One of two ends of the plurality of resistors which is not connected to the peer resistor is connected to a current path of the low melting metal. The current control element is connected to a selected one of a plurality of terminals provided at the ends of the resistors not connected to the low melting metal. Selection of the one terminal is made taking into account a range of voltage variations of the battery unit.

A battery pack according to the present invention includes a battery unit including one or more chargeable/dischargeable battery cells, and a charging/discharging control circuit connected in series with the battery unit for controlling the charging/discharging the battery unit. The battery pack also includes a low melting metal connected to a charging/discharging current path in series between the battery unit and the charging/discharging control circuit. The low melting metal is melted and disrupted on heating. The battery pack also includes a heating unit composed by a plurality of series-connected resistors that, when fed with current, emit heat that melts the low melting metal. The battery pack further includes a detection circuit that detects a voltage value of each battery cell of the battery unit, and a current control element. The current control element exercises control to cause the current to flow from the low melting metal to the heating unit when the voltage value of one or more of the battery cells of the battery unit is outside a pre-set range. One of two ends of the plurality of resistors which is not connected to the peer resistor is connected to a current path of the low melting metal. The current control element is connected to a selected one of a plurality of terminals provided at the ends of the resistors not connected to the low melting metal. Selection of the one terminal is made taking into account a range of voltage variations of the battery unit.

According to the present invention, a terminal is provided at each end of each resistor which is not connected to the low melting metal. These terminals are selected, taking into account a range of voltage variations of the battery unit, for connection to one or more current control element(s) that control the current flowing from the low melting metal to the heating unit. It is thus possible with the present invention to select one or more resistors of the heating unit for heating, taking into account the range of the voltage variations of the battery unit, in order to adjust the quantity of heat used to heat the low melting metal. Viz., according to the present invention, the current control element(s) is connected to the terminal selected taking into account the range of the voltage variations of the battery unit. By so doing, it is possible to positively melt the low melting metal by the heat of the heating unit to interrupt the charging/discharging current path of the battery unit as the broad voltage variations of the battery unit are coped with.

BEST MODE FOR CARRYING OUT THE INVENTION

A preferred mode for carrying out the present invention will now be described with reference to the drawings. It should be noted that the present invention is not limited to the following mode such that a large variety of modifications may be made without departing from the purport of the invention.

<Global Configuration>

Figure 1:
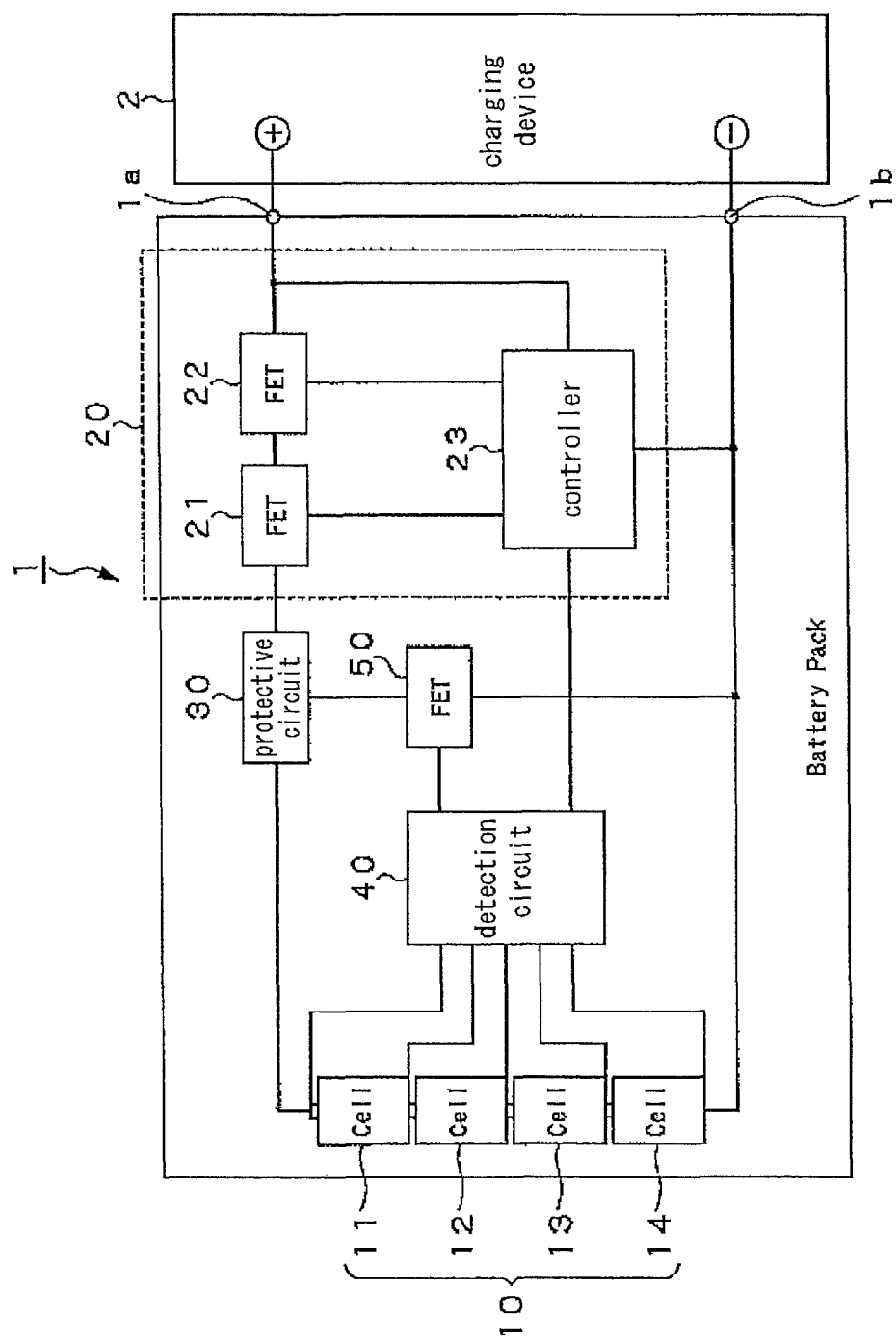
FIG. 1 is a block circuit diagram showing the global configuration of a battery pack according to the present invention.

The protective circuit according to the present invention is a circuit that protects a battery unit composed by a plurality of chargeable/dischargeable battery cells and a charging/discharging control circuit. In use, the protective circuit is built into a battery pack 1 including a battery unit 10 made up of a sum total of four chargeable/dischargeable battery cells 11 to 14 shown for example in FIG. 1.

Specifically, the battery pack 1 includes the battery unit 10, a charging/discharging control circuit 20, a protective circuit 30, a detection circuit 40 and a current control element 50. The charging/discharging control circuit controls the charging/discharging of the battery unit 10, while the protective circuit protects the battery unit 10 and the charging/discharging control circuit 20. The detection circuit detects the voltage of each of the battery cells 11 to 14, while the current control element controls the operation of the protective circuit 30 depending on the results of detection of the detection circuit 40.

The battery unit 10 is a series connection of the battery cells 11 to 14 that need to be controlled to prevent them from becoming over-charged or over-discharged, such as lithium ion battery cells. The battery unit is detachably connected to a charging device 2, via a positive terminal 1a and a negative terminal 1b of the battery pack 1, so that the charging voltage may be applied to the battery unit from the charging device 2.

The charging/discharging control circuit 20 includes two current control elements 21, 22, connected in series with each other on a path of the current flowing from the battery unit 10 to the charging device 2, and a controller 23 that controls the operation of these current control elements 21, 22. Each of the current control elements 21, 22 is formed as, for example, a field-effect transistor, referred to below as FET, whose gate voltage is controlled by the controller 23 such as to control the connection or interruption of the current path of the battery unit 10. The controller operates by the power delivered from the charging device 2 to control the operation of the current control elements 21, 22, based on the result of detection by the detection circuit 40, such as to interrupt the current path in case of over-charging or over-discharging of the battery unit 10.

The protective circuit 30 is connected to a charging/discharging current path between the battery 10 and the charging/discharging control circuit 20, and has its operation controlled by the current control element 50.

The detection circuit 40 is connected to the battery cells 11 to 14 to detect voltage values thereof to transmit respective voltage values to the controller 23 of the charging/discharging control circuit 20. The detection circuit 40 also outputs a control signal that controls the current control element 50 when one of the battery cells 11 to 14 is at an over-charged or over-discharged voltage.

If it is found by a detection signal, output from the detection circuit 40, that the voltage values of the battery cells 11 to 14 are outside a pre-set range, in more concrete terms, in an over-charged or over-discharged state, the current control element 50 runs the protective circuit 30 in operation. Specifically, the current control element exercises control to interrupt the charging/discharging current path of the battery unit 10.

In the above described battery pack 1, the configuration of the protective circuit 30 will now be described in more detail.

<Configuration of Protective Circuit>

In the protective circuit 30 according to the present invention, it is necessary to cope with broad voltage variations of the battery unit 10 to reliably melt the low melting metal by the heat of resistors to interrupt the charging/discharging path for the battery unit 10. To this end, the protective circuit is of a circuit configuration shown in FIG. 2.

Figure 2:
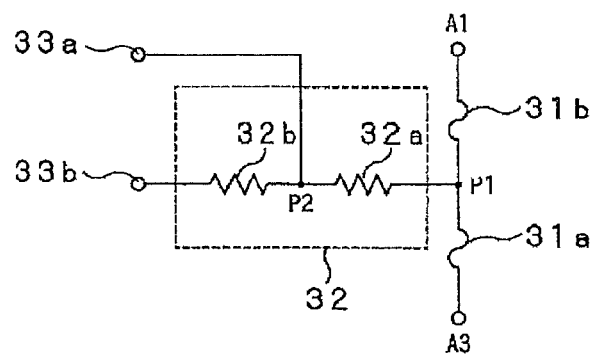
FIG. 2 is a circuit diagram showing a circuit configuration of a protective circuit according to the present invention.

Viz., the protective circuit 30 includes fuses 31a, 31b, formed of a low melting metal, melt-disrupted on heating, and a heating unit 32, as shown in FIG. 2. The heating unit is composed by two resistors 32a, 32b connected in series with each other to generate heat that melts the fuses 31a, 31b when the heating unit is fed with current.

The fuses 31a, 31b are inherently formed by a single member which is formed of low melting metal and which is split into two parts to form a circuit shown. Viz., the two parts are joined together at a junction point P1 to form a series circuit composed by the two parts. The fuses are connected in series with each other on a charging/discharging current path between the battery unit 10 and the charging/discharging controlling circuit 20. For example, the fuse 31a is connected to the charging/discharging controlling circuit 20 via a junction point A3 not connected to the fuse 31b, while the fuse 31b is connected to the battery unit 10 via a junction point A1 not connected to the fuse 31a.

The heating unit 32 is composed by resistors 32a, 32b that are connected in series with each other via a junction point P2. When fed with current, the heating unit generates heat that melts the fuses 31a, 31b.

In the protective circuit 30, one of two ends of each of the two resistors 32a, 32b, not connected to the peer resistor, for example, one of the ends of the resistor 32a, is connected via junction point P1 to the fuses 31a, 31b. On the other hand, in the protective circuit 30, the ends of the connectors 32a, 32b, not connected to the fuses 31a, 31b, are respectively provided with terminals 33a, 33b, which terminals are connected to the current control element 50 that controls the current flowing through the heating unit 32. In the protective circuit 30, the terminal 33a or 33b, as selected taking into account the range of voltage variations of the battery unit 10, is connected to the current control element 50.

Thus, in the protective circuit 30, the resistor 32a or 32b of the heating unit 32 is selected, taking into account the range of voltage variations of the battery unit 10, in order to adjust the quantity of heat to heat the fuses 31a, 31b. Thus, in the protective circuit 30, the current control element 50 is connected to the terminal 33a or 33b taking into account the range of voltage variations of the battery unit 10. By so doing, the fuses 31a, 31b may reliably be melted by the heat of the resistors 32a, 32b, against the broad voltage variations of the battery unit, as the resistors 32a, 32b are prevented from becoming damaged, thereby reliably interrupting the charging current path of the battery unit 10.

The present invention is not limited to switching between two current paths of the heating unit 32 of the protective circuit 30, such as to adjust the quantity of heating, using the sum total of two of the terminals 33a, 33b. Viz., the protective circuit 30 of the present invention may be configured so that larger numbers of resistors composing the heating unit are used and so that the respective ends of these resistors not connected to the low melting metal are provided with terminals. One of these terminals, as selected taking into account the range of variations of the battery voltages of the battery unit, may be connected to the current control element.

<Concrete Example Connections of Protective Circuit>

In the following, two concrete example connections, in which the terminals 33a, 33b, provided in the protective circuit 30, configured as described above, are connected to the current control element 50, will now be described.

<First Example Connection>

In the battery pack 1 of a first example connection, the quantity of heat to be generated by the fuses 31a, 31b is adjusted by electrically connecting the current control element 50 to one of the terminal 33a and 33b of the protective circuit 30 as selected taking into account the range of voltage variations of the battery unit. This range of voltage variations may be determined by the number of the battery cells connected to form the battery unit.

Figure 3:
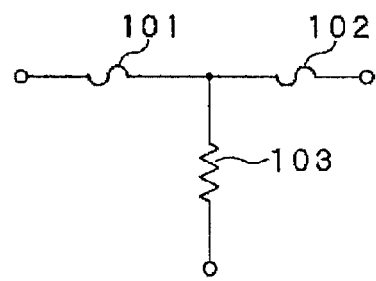
FIG. 3 is a circuit diagram showing a circuit configuration of a protective circuit of the related technique.

Before proceeding to explanation of the battery pack 1 of the first example connection, a protective circuit 100 according to a conventional technique shown in FIG. 3 will be explained. Viz., the protective circuit 100 includes series-connected fuses 101, 102, and a resistor 103 which, if fed with current via a junction between the fuses 101, 102, melts the fuses 101, 102. Moreover, in the protective circuit 100, the fuses 101, 102 are connected in series on a charging/discharging current path, while the resistor 103 is connected to the current control element.

If such protective circuit 100 is to cope with the number of connection of battery cells of 2 and 3, it is necessary for the resistor 103 to cope with high power consumption, with the consequence that the resistor 103 per se becomes bulky in size.

For a case where the resistance value R of the resistor 103 is R=2.2[$\Omega$], the voltage applied is V [V] and the power consumption is P [W], changes in the power consumption for a variable number of the battery cells connected to form the battery unit will now be considered.

It is supposed that, with the number of the battery cells, connected to form the battery unit, being 2, one of the battery cells is shorted, such that, for example, V=4 [V] is applied to the resistor 103. In this case, the power consumption P may be calculated as follows:

$$P=4\times 4/2.2=7.4 \, [W].$$

It is then assumed that, with the number of the battery cells, connected to form the battery unit, being 2, the two battery cells are in an over-voltage state, or that, with the number of the battery cells, connected to form the battery unit, being 3, one of the battery cells is shorted. It is also assumed that, in such cases, V=9 [V] is applied to the resistor 103. The power consumption may then be calculated as follows:

$$P=9\times 9/2.2=37.7 \, [W].$$

It is then supposed that, with the number of the battery cells, connected to form the battery unit, being 3, the three battery cells are in over-voltage states, such that, for example, V=13.8 [V], is applied to the resistor 103. The power consumption P may then be calculated as follows:

$$P=13.8\times13.8/2.2=88.6\ [W].$$

In this manner, the current value flowing through the resistor as well as power consumption is increased with increase in the voltage applied V. It is thus necessary for the resistor 103 to cope with the high power consumption, with the consequence that the resistor 103 per se becomes bulky in size. Thus, if power consumption is to be lowered in the protective circuit 100 of the conventional technique, it is necessary to individually design the resistance value of the resistor in keeping with the number of the battery cells connected to form the battery unit.

In the battery pack 1 of the first example connection, in contrast to the protective circuit 100, described above, the terminal 33a formed in the protective circuit 30 is used for example in case the number of the battery cells connected is 2. On the other hand, the terminal 33b, also formed in the protective circuit 30, is used for example in case the number of the battery cells connected is 3. In the protective circuit 30, the operating voltages and the resistance value of the heating unit, which is being adjusted, may be designed, for the cases of the number of the battery cells connected being 2 and 3, as shown in the following Table 1:

TABLE 1

| | |
|---|---|
| operating voltage (for the number of battery cells connected being 2) | 4.0-9.0 V |
| resistance value (for the number of battery cells connected being 2) | 1.7-2.6 Ω |
| operating voltage (for the number of battery cells connected being 3) | 7.4-13.8 V |
| resistance value (for the number of battery cells connected being 2) | 5.5-9.1 Ω |

Figures 4A, 4B:
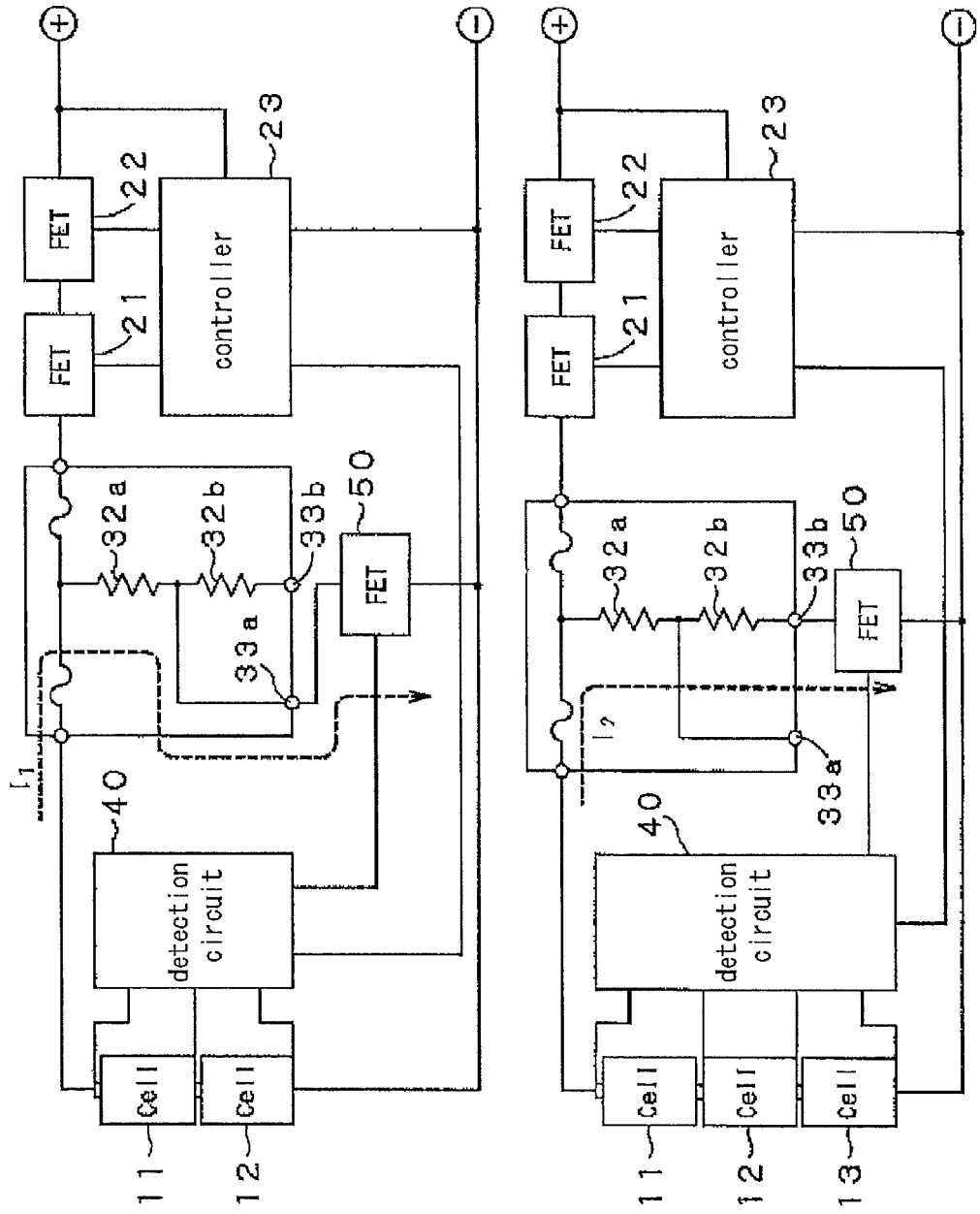
FIG. 4A is a circuit diagram for illustrating the configuration of a battery pack of a first example connection, with the number of connection of the battery cells being 2.
FIG. 4B is a circuit diagram for illustrating the configuration of the battery pack of the first example connection, with the number of connection of the battery cells being 3.

The protective circuit 30, described above, is used as it is built in the battery pack 1 of the first example connection, depending on the number of the battery cells connected, as follows:

In case the battery unit 10 includes two battery cells 11, 12, with the number of the battery cells connected thus being 2, the current control element 50 is connected to the terminal 33a of the protective circuit 30, as shown for example in FIG. 4A, so that a current I1 will flow just through the resistor 32a of the heating unit 32. In case the battery unit 10 includes three battery cells 11 to 13, with the number of the battery cells connected thus being 3, the current control element 50 is connected to the terminal 33b of the protective circuit 30, as shown for example in FIG. 4B, so that a current I2 will flow through both the resistors 32a and 32b of the heating unit 32.

Viz., if, in the battery pack 1 of the first example connection, the number of the battery cells connected is smaller such that the voltage applied to the heating unit 32 is smaller, the operating resistance value of the heating unit 32 of the protective circuit 30 may be lowered. On the other hand, if, in the battery pack 1 of the first example connection, the number of the battery cells connected is larger such that the larger voltage is applied to the heating unit 32, the operating resistance value of the heating unit 32 of the protective circuit 30 may be raised.

In the battery pack 1 of the first example connection, described above, the voltage of the battery unit may shift to a higher voltage value, within the range of voltage variations, with increase in the number of the battery cells connected to form the battery unit. In such case, the terminal 33a or 33b on the current path including a larger number of the resistors of the heating unit 32, herein the resistors 32a, 32b, is selected, out of the terminal 33a and 33b connected to the heating unit 32. The terminal 33a or 33b, thus selected, is connected to the current control element 50. Viz., in the protective circuit 30, there are provided a plurality of the terminals that may be selected for connection to the current control element 50 as the number of the battery cells connected to form the battery unit is taken into account. Hence, the heating unit, provided with resistors lower in power consumption than those in the protective circuit 100, may be built into a desired one of a plurality of sorts of battery packs different in the number of the battery cells connected.

<Second Example Connection>

Figures 5A, 5B:
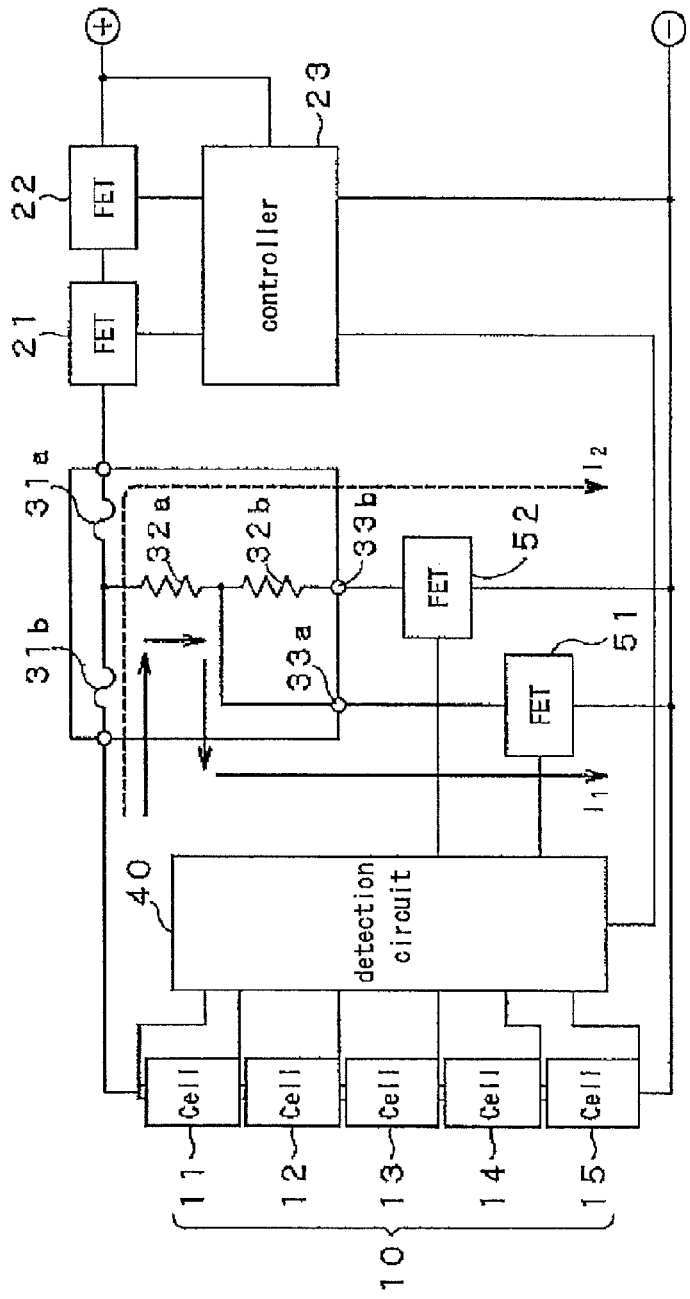
FIG. 5A is a circuit diagram for illustrating the configuration of a battery pack of a second example connection.
FIG. 5B shows, in a tabulated form, the operation of the battery pack of the second example connection in case the voltage applied to the protective circuit is changed.

In a battery pack 1 of a second example connection, current control elements 51, 52 are respectively connected to two terminals 33a, 33b provided in the protective circuit 30, as shown in FIG. 5A. In particular, in case the second example connection is built in the battery pack with a larger number of battery cells connected, it is possible to interrupt the charging/discharging path such as to cope with a broad range of voltage variations in the battery unit, as the resistors 32a, 32b are prevented from becoming damaged.

Specifically, given a battery pack 1 of the second example connection, with the battery unit 10 including battery cells 11 to 15, with the number of the battery cells thus being 5, the charging/discharging path may positively be interrupted within a range of 4 to 20 [V] of the voltage applied to the protective circuit 30. Viz., such a state in which the battery cells may be shorted may be coped with, as the resistors 32a, 32b are prevented from becoming damaged.

In the battery pack 1 of the second example connection, when the voltage value applied to the protective circuit 30 is lower and is 4 to 8 [V], the current control elements 51, 52 are turned on and off, respectively, to permit the current I1 to pass through just the resistor 32a, as shown in FIG. 5B. When the voltage value applied to the protective circuit 30 is higher and is 8 to 20 [V], the current control elements 51, 52 are turned off and on, respectively, to permit the current I2 to pass through both the resistors 32a, 32b. The voltage applied to the protective circuit 30 may be detected by, for example, the detection circuit 40. This detection circuit confirms whether or not the voltage value exceeds 8 [V] to control the operation of the current control elements 51, 52 depending on the result confirmed.

FIG. 5B shows, in a tabulated form, the relationship of correspondence among a resistance value R1 of the resistor 32a, a resistance value R2 of the resistor 32b, a 'current 1' flowing through the resistor 32a, a 'current 2' flowing through the resistor 32b, a 'power 1' indicating the power consumption by the resistor 32a, a 'power 2' indicating the power consumption by the resistor 32b, 'FET 1' indicating the status of the current control element 51 and 'FET 2' indicating the status of the current control element 52, under a condition that the voltage applied to the protective circuit 30 is changed.

As described above, in the battery pack 1 of the second example connection, the two terminals 33a, 33b, provided in the protective circuit 30, are respectively connected to the current control elements 51, 52. The current paths through the inside of the protective circuit 30 are switched as the voltage applied to the protective circuit 30 is taken into account.

Thus, in the battery pack 1 of the second example connection, there are provided a plurality of the current control elements 51, 52. The current control element 51 or 52 is connected to one of the two terminals 33a and 33b selected from one division of the range of voltage variations of the battery unit to another. The battery pack 1 exercises control so that, as the voltage value of the division of the range of voltage variations of the battery unit of interest becomes higher, the current will flow from the fuse 31a through the heating unit 32 via the current control element 52. Note that the current control element 52 is connected to the terminal 33b, out of the terminals 33a, 33b connected to the current control elements 51, 52, which is provided on a current path the current is to flow through via both the resistors 32a, 32b.

Thus, when built into the battery pack, whose battery unit is composed by a larger number of battery cells, the protective circuit 30 of the second example connection is able to interrupt the charging/discharging path against a broad range of voltage variations of the battery unit 10 as the resistors 32a, 32b are prevented from being destructed.

<First Structure that Implements Protective Circuit>

Figure 6:
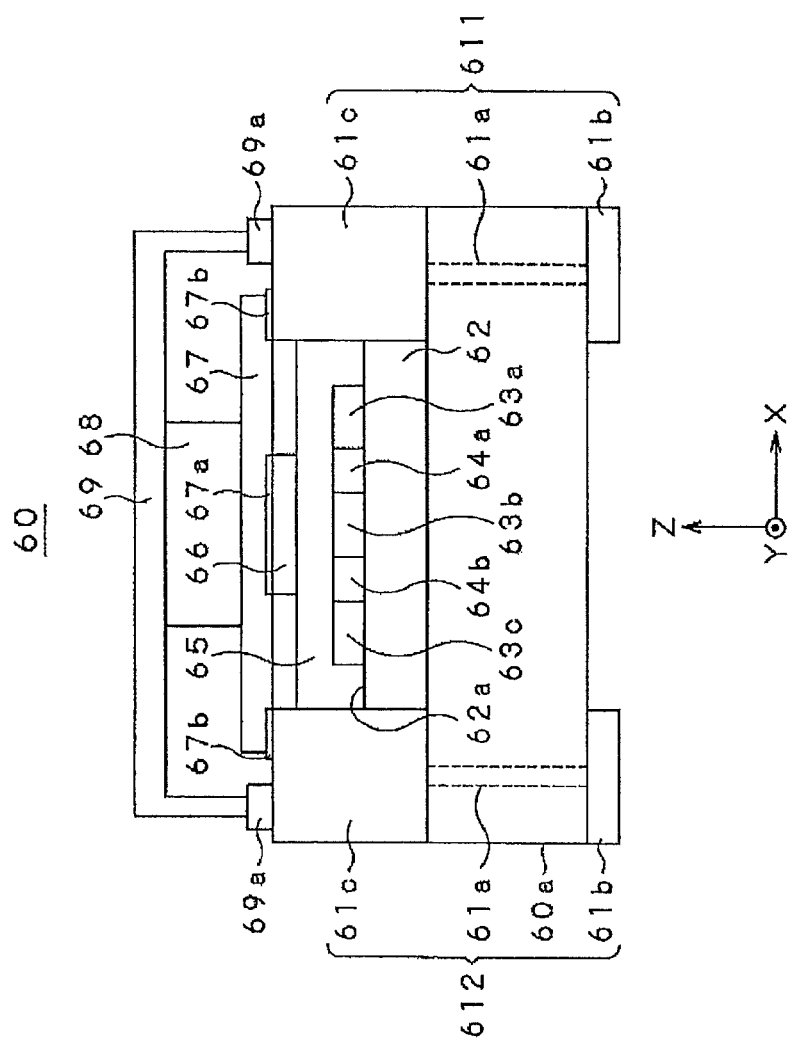
FIG. 6 is a cross-sectional view of a first structural unit that implements a protective circuit according to the present invention.

The protective circuit 30, having the circuit configuration as described above, may be implemented by a structural unit 60 shown for example in FIGS. 6 and 7.

Figure 7A:
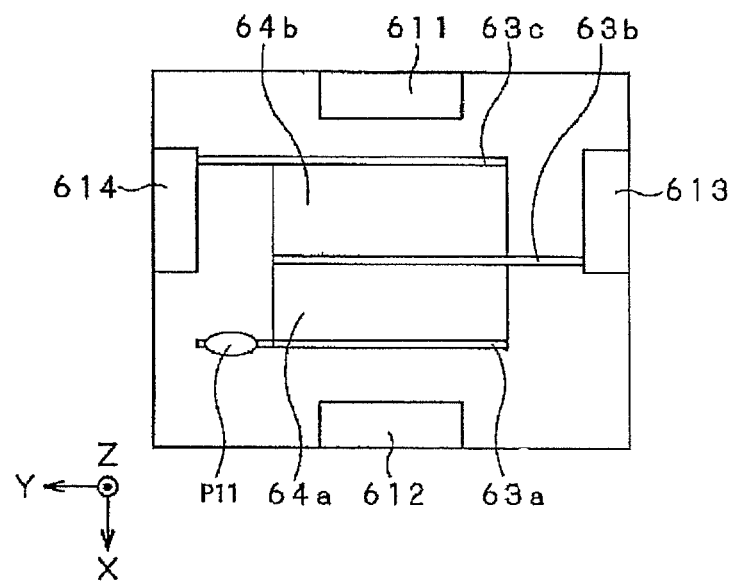
FIG. 7A is a plan view for illustrating the connection between contacts P11 and P12 in the first structural unit.
Figure 7B:
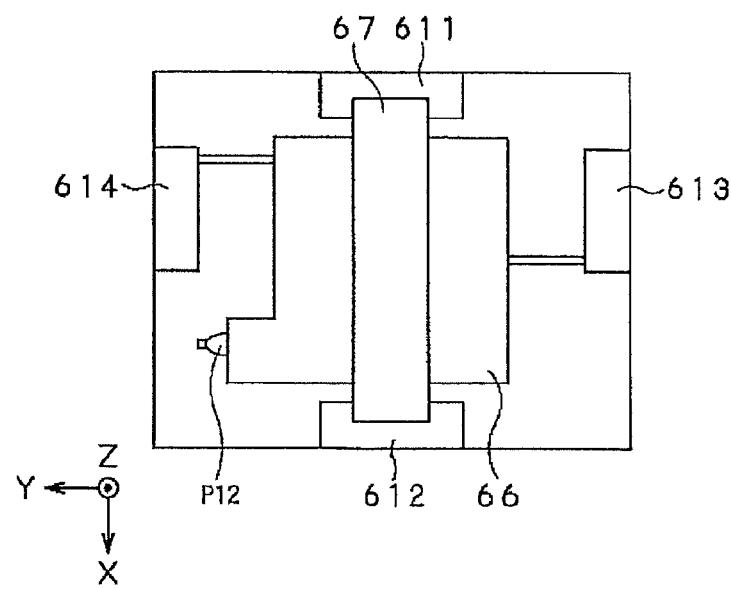
FIG. 7B is another plan view for illustrating the connection between contacts P11 and P12 in the first structural unit.

FIG. 6 depicts a cross-sectional view of the structural unit 60, arranged in a three-dimensional orthogonal coordinate system XYZ, as reference, with the structural unit being seen from an XZ plane. FIGS. 7A, 7B illustrate a stacked structure of the structural unit 60, with the structural unit being seen from an XY plane.

The structural unit 60 is constructed by mounting the following members on a rectangular-shaped substrate 60a of an insulating material, such as ceramics.

Viz., connection members 611 to 614, each composed by conductors 61b, 61c, are arranged on four lateral sides of the substrate 60a placed on the XY plane. The conductors 61b, 61c are connected to each other via through-holes 61a bored through the inside of the substrate 60a in the Z-direction as shown.

Out of the four connection members 611 to 614, the two connection members 611, 612, facing each other, respectively operate as contacts connected to the battery unit 10 and to the charging/discharging control circuit 20. The remaining two connection members 613, 614 respectively operate as the above mentioned terminals 33a, 33b to be selected taking into account the range of voltage variations of the battery unit 10.

A plate-shaped insulation member 62 is mounted at a mid portion on the surface of the substrate 60a. On a surface 62a of the plate-shaped insulation member 62, there are mounted a conductor 63a, a resistor 64a connected to the conductor 63a, a conductor 63b connected to the resistor 64a, a resistor 64b connected to the conductor 63b and a conductor 63c connected to the resistor 64b. The conductor 63b is connected to the conductor 61c of the connection member 613, operating as the terminal 33a, whilst the conductor 63c is connected to the conductor 61c of the connection member 614 operating as the terminal 33b. By this relationship of interconnection, the connection members 613, 614, operating respectively as the terminals 33a, 33b, are branched from the resistors 64a, 64b via conductors 63b, 63c, respectively. The conductors 63b, 63c operate as interconnections connected to the resistors 64a, 64b, respectively.

The resistors 64a, 64b are mounted on a mount surface which is covered by an insulation member 65. On the surface of the covering insulation member 65, a low melting metal 67 is mounted via a conductor 66. The conductor 66 and the low melting metal 67 are interconnected by a solder 67a.

One end P11 of the conductor 63a is connected via contact P12 of the conductor 66 to the low melting metal 67. Specifically, to effect this connection, the contact P11 is provided at the end of the conductor 63a on the mount surface of the insulation member 62 that has mounted thereon the conductors 63a, 63b, 63c and the resistors 64a, 64b, as shown in FIG. 7A looking at the structural unit 60 from the –Z direction. The conductor 66 is covered by the insulation member 65 so that the contact p11 and the contact P12 of the conductor 66 will be connected together, as shown in FIG. 6. Additionally, the low melting metal 67 is mounted on the conductor 66. Viz., the end P11 is arranged more outwardly than the outer periphery of the resistors 64a, 64b, while the end P12 is arranged more outwardly than the outer periphery of the insulation member 65, in such a manner that, on stacking the respective parts together, the ends P11, P12 will be in register with each other.

The low melting metal 67 is connected via a solder 67b to the conductors 61c of the connection members 611, 612 operating as contacts connected respectively to the battery unit 10 and to the charging/discharging control circuit 20. A flux 68 is provided on an upper surface of the low melting metal 67. An upper part of the low melting metal 67 is covered by a cap 69 which is attached by an adhesive 69a to the four connection members 61.

In the structural unit 60, described above, the resistors 64a, 64b are formed on the same planar surface of the insulation member 62. The resistors 64a, 64b are separated from each other by the conductors 63b, 63c connected to the connection members 61 operating as the terminals 33a, 33b. In this manner, since the resistors 64a, 64b in the structural unit 60 are arranged in the same plane, the protective circuit 30 may be reduced in thickness.

<Modification of First Structural Unit>

Figure 8A:
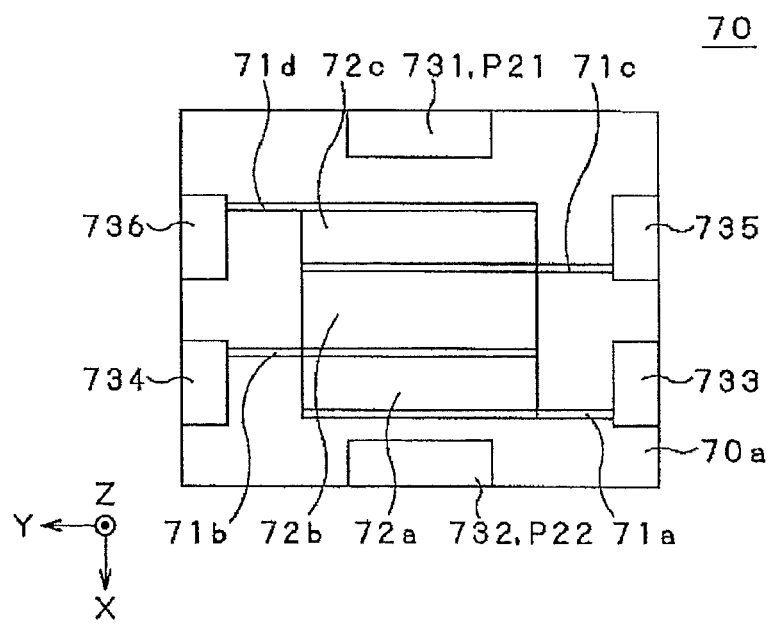
FIG. 8A is a plan view for illustrating the structure according to a modification of the first structural unit.

In the structural unit 60, the two resistors 64a, 64b are separated on the same plane from each other by the conductors 63a, 63b and 63c. The number of the resistors may, however, be larger, as described above. For example, three resistors 72a, 72b, 72c, separated from one another on the same plane by conductors 71a, 71b, 71c and 71d, may be mounted on the surface of an insulation member 70a, as shown for example in FIG. 8A. In a structural unit 70, having such a structure, a sum total of six connection members 731 to 736 are provided. Of these, the connection members 731, 732 operate as contacts P21, P22 by which the low melting metal is connected to the battery unit 10 and to the charging/discharging control circuit 20, respectively. The connection member 733 operates as contact P23 between the low melting metal and the resistor. The other three connection members 734 to 736 operate as terminals connected to the current control element.

Figure 8B:
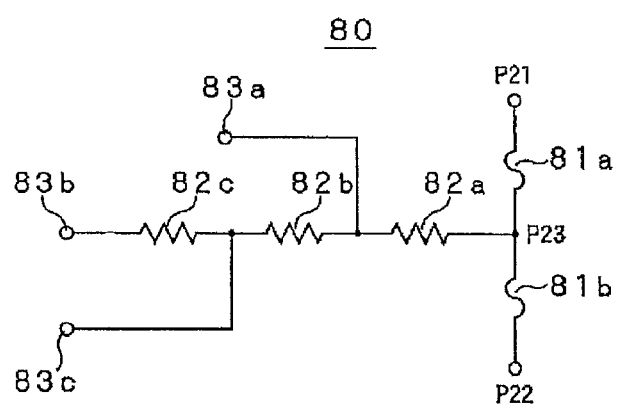
FIG. 8B is a circuit diagram for illustrating the circuit configuration of an equivalent circuit of the modification of the first structural unit.

In a protective circuit 80, with the above mentioned mount state of the structural unit 70, fuses 81a, 81b are respectively connected via contacts P21, P22 to the battery 10 and to the charging/discharging control circuit 20, as shown in FIG. 8B. The fuses are obtained by splitting a sole low melting metal piece into two. A heating unit 82 of the protective circuit 80, composed by a series connection of resistors 82a, 82b and 82c, may be implemented by the resistors 72a, 72b and 72c. Also, in the protective circuit 80, three terminals 83a, 83b, 83c are provided in conjunction with the resistors 82a, 82b, 82c, respectively. The terminals 83a, 83b, 83c are implemented by the three connection members 734, 735, 736, respectively. In the present protective circuit 80, the resistance value may be adjusted in three stages by connecting the current control element to any one of the terminals 83a, 83b and 83c, as shown in the following Table 2. It is thus possible, with the protective circuit 80, to adjust the resistance value of the heating unit 82 in three stages and hence to cope more delicately with voltage variations of the battery unit as the device size is suppressed from increasing.

TABLE 2

| target of connection | resistance value [Ω] |
|---|---|
| terminal 83a | 14.7 |
| terminal 83b | 7.3 |
| terminal 83c | 2.15 |

<Second Structural Unit to Implement the Protective Circuit>

Figure 9:
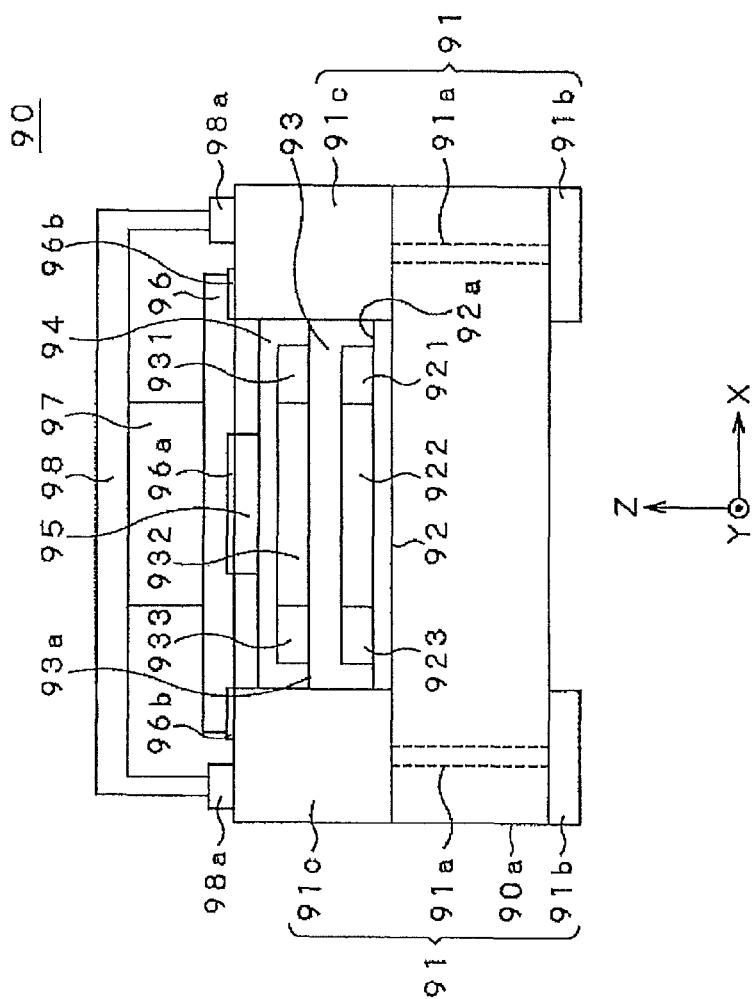
FIG. 9 is a cross-sectional view of a second structural unit that implements a protective circuit according to the present invention.

The protective circuit 30 may also be implemented by, for example, a structural unit 90 shown in FIG. 9.

FIG. 9 depicts a cross-sectional view of the structural unit 90, arranged in a three-dimensional orthogonal coordinate system XYZ, as reference, with the structural unit being seen from an XZ plane.

The structural unit 90 may be constructed by mounting the following components on a rectangular-shaped substrate 90a of an insulating material, such as ceramics, as shown in FIG. 9.

Viz., four connection members 91, each composed by conductors 91b, 91c, are arranged on four lateral sides of the substrate 90a placed on the XY plane. The conductors 91b, 91c are connected to each other via a through-hole 91a bored through the bulk of the substrate 90a in the Z-direction as shown.

Out of the four connection members 91, the two connection members, facing each other, operate as contacts connected to the battery unit 10 and to the charging/discharging control circuit 2. The remaining two connection members 91 operate as the above mentioned terminals 33a, 33b to be selected as the range of voltage variations of the battery unit 10 is taken into account.

A plate-shaped insulation member 92 is mounted on a mid portion of the front surface of the substrate 90a. On a front surface 92a of the plate-shaped insulation member 92, there are mounted a conductor 921, a resistor 922 connected to the conductor 921, and a conductor 923 connected to the resistor 922. The conductor 923 is connected to the conductor 91c of the connection member 91 operating as the terminal 33b.

On the mount surface of the insulation member 92, having mounted thereon the resistor 922, there is further mounted a plate-shaped insulation member 93. On a front surface 93a of the plate-shaped insulation member 93, there are mounted a conductor 931, a resistor 932, connected to the conductor 931, and a conductor 933, connected to the resistor 932. The conductor 933 is connected to the conductor 91c of the connection member 91 operating as the terminal 33a.

The mount surface of the insulation member 93, having mounted thereon the resistor 932, is covered by an insulation member 94. A low melting metal 96 is mounted on the covering surface of the insulation member 94 via a conductor 95. The conductor 95 and the low melting metal 96 are connected to each other via a solder 96a.

One end of the conductor 921 and one end of the conductor 931 are connected via the conductor 95 to the low melting metal 96. Specifically, one end of the conductor 921 is arranged more outwardly than the outer periphery of the resistor 922, whilst one end of the conductor 931 is arranged more outwardly than the outer periphery of the insulation member 93 and an end of the conductor 95 is arranged more outwardly than the outer periphery of the insulation member 94, in such a manner that, on stacking the respective parts together, the respective ends will be in register with each other.

The low melting metal 96 is connected via solder 96b to the conductors 91c of the connection members 91 operating as contacts connected to the battery unit 10 and the charging/discharging control circuit 20. A flux 97 is provided on the upper surface of the low melting metal 96.

On top of the low melting metal 96, in the structural unit 90, there is provided a cap 98 that protects the surface of the low melting metal 96 from exposure to outside. The cap 98 is attached to the four connection members 91 via adhesive 98a.

In the above described structural unit 90, in which the resistors 922, 932 are formed as a stack in which the resistors are separated from each other via the insulation member 93, the resistor mounting area may be made broader than in the above mentioned structural unit 60. It is thus possible to heat and melt the low melting metal more evenly.

The invention claimed is:

1. A protective circuit comprising
a low melting metal connected to a charging/discharging current path in series between a battery unit composed by one or more chargeable/dischargeable battery cells and a charging/discharging control circuit; the low melting metal being melted and disrupted on heating; and
a heating unit composed by a plurality of resistors that, when fed with current, emit heat that melts the low melting metal; wherein,
one of two ends of the plurality of resistors which is not connected to the other resistor is connected to a current path of the low melting metal;
the ends of the resistors not connected to the low melting metal carrying a plurality of terminals selected, as a range of voltage variations of the battery unit is taken into account, for connection to a current control element that controls the current flowing through the heating unit.

2. The protective circuit according to claim 1, wherein,
the terminals are provided branched from ends of the resistors via interconnections;
the plurality of resistors of the heating unit are formed on the same plane and separated from one another by an interconnection(s) connected to the terminals.

3. The protective circuit according to claim 2, wherein,
the end of the resistor connected to the low melting metal is connected to a median point of the current path of the current flowing through the low melting metal.

4. The protective circuit according to claim 1, wherein,
the heating unit is composed by a stack of the resistors separated from each other by an insulating member(s).

5. The protective circuit according to claim 4, wherein,
the end of the resistor connected to the low melting metal is connected to a median point of the current path of the current flowing through the low melting metal.

6. The protective circuit according to claim 1, wherein,
the end of the resistor connected to the low melting metal is connected to a median point of the current path of the current flowing through the low melting metal.

7. A battery unit control device comprising
a charging/discharging control circuit connected in series with a battery unit composed by a plurality of chargeable/dischargeable battery cells; the charging/discharging control circuit controlling the charging/discharging of the battery unit;
a low melting metal connected to a charging/discharging current path in series between the battery unit and the charging/discharging control circuit; the low melting metal being melted and disrupted on heating;
a heating unit composed by a plurality of series-connected resistors that, when fed with current, emit heat that melts the low melting metal;

a detection circuit that detects a voltage value of each battery cell of the battery unit; and a current control element that exercises control to cause the current to flow from the low melting metal to the heating unit when the voltage value of one or more of the battery cells of the battery unit is outside a pre-set range; wherein, one of two ends of the plurality of resistors which is not connected to the other resistor is connected to a current path of the low melting metal;

the current control element being connected to a selected one of a plurality of terminals provided at the ends of the resistors not connected to the low melting metal; selection of the one terminal being made taking into account the range of voltage variations of the battery unit.

8. The battery unit protective circuit according to claim 7, wherein, as the voltage value of a division of the range of voltage variations of the battery unit of interest becomes higher with increase in the number of battery cells connected to form the battery unit, such terminal on a current path of the current flowing through a larger number of the resistors, out of the plurality of the terminals connected to the heating unit, is selected and connected to the current control element.

9. The battery unit protective circuit according to claim 7, wherein, there are provided a plurality of the current control elements;

each current control element being connected to the terminal, out of the plurality of terminals, that is selected from one division of the range of voltage variations of the battery unit to another;

as the voltage value of the division of the range of voltage variations of the battery unit of interest becomes higher, the current control element connected to the terminal on a current path of the current flowing through a larger number of the resistors, out of the plurality of the terminals connected to the heating unit, exercising control to cause the current to flow from the low melting metal to the heating unit.

10. A battery pack comprising a battery unit including one or more chargeable/ dischargeable battery cells;

a charging/ discharging control circuit connected in series with the battery unit for controlling the charging/ discharging of the battery unit;

a low melting metal connected to a charging/ discharging current path in series between the battery unit and the charging/ discharging control circuit; the low melting metal being melted and disrupted on heating;

a heating unit composed by a plurality of series-connected resistors that, when fed with current, emit heat that melts the low melting metal;

a detection circuit that detects a voltage value of each battery cell of the battery unit; and a current control element that exercises control to cause the current to flow from the low melting metal to the heating unit when the voltage value of one or more of the battery cells of the battery unit is outside a pre-set range; wherein, one of two ends of the plurality of resistors which is not connected to the other resistor is connected to a current path of the low melting metal;

the current control element being connected to a selected one of a plurality of terminals provided at the ends of the resistors not connected to the low melting metal; selection of the one terminal being made taking into account a range of voltage variations of the battery unit.

* * * * *